(12) United States Patent
Steinlage et al.

(10) Patent No.: US 12,217,414 B2
(45) Date of Patent: Feb. 4, 2025

(54) IDENTIFY CARRYBACK IN UNKNOWN TRUCK BED

(71) Applicant: Caterpillar SARL, Geneva (CH)

(72) Inventors: Justin Lee Steinlage, Mackinaw, IL (US); Christopher R. Wright, Peoria, IL (US)

(73) Assignee: Caterpillar SARL, Geneva (CH)

(*) Notice: Subject to any disclaimer, the term of this patent is extended or adjusted under 35 U.S.C. 154(b) by 238 days.

(21) Appl. No.: 17/830,478

(22) Filed: Jun. 2, 2022

(65) Prior Publication Data

US 2023/0394650 A1   Dec. 7, 2023

(51) Int. Cl.

| | |
|---|---|
| *G06T 7/00* | (2017.01) |
| *E02F 3/30* | (2006.01) |
| *E02F 9/26* | (2006.01) |
| *G01F 23/292* | (2006.01) |
| *G06Q 10/087* | (2023.01) |
| *G06T 7/62* | (2017.01) |
| *G06T 7/68* | (2017.01) |

(52) U.S. Cl.
CPC ............... *G06T 7/001* (2013.01); *E02F 9/26* (2013.01); *G01F 23/292* (2013.01); *G06Q 10/087* (2013.01); *G06T 7/62* (2017.01); *G06T 7/68* (2017.01); *E02F 3/308* (2013.01); *G06T 2207/10028* (2013.01); *G06T 2207/20021* (2013.01); *G06T 2207/20228* (2013.01); *G06T 2207/30108* (2013.01)

(58) Field of Classification Search
CPC .. G06T 7/001; G06T 7/62; G06T 7/68; G06T 2207/10028; G06T 2207/20021; G06T 2207/20228; G06T 2207/30108; E02F 9/26; E02F 3/308; G01F 23/292; G06Q 10/087
See application file for complete search history.

(56) References Cited

U.S. PATENT DOCUMENTS

| | | | |
|---|---|---|---|
| 11,061,409 B2 | 7/2021 | Hendricks | |
| 11,131,082 B2 | 9/2021 | Sherlock | |
| 2012/0267528 A1* | 10/2012 | Sakai | G03F 7/70466 250/311 |
| 2015/0002303 A1* | 1/2015 | Stanley | G01G 19/08 340/666 |
| 2016/0187182 A1 | 6/2016 | Beltramin | |

(Continued)

FOREIGN PATENT DOCUMENTS

| | | |
|---|---|---|
| AU | 2020215504 A1 | 8/2021 |
| AU | 2021200594 A1 | 8/2021 |

(Continued)

OTHER PUBLICATIONS

Written Opinion and International Search Report for Int'l. Patent Appln. No.PCT/US2023/025253, mailed Sep. 22, 2023 (11 pgs).

*Primary Examiner* — Dale W Hilgendorf

(57) ABSTRACT

A system for detecting carryback within a dump body of a haul truck may include at least one camera and at least one controller. The at least one camera is configured to generate a scan of an interior surface of the dump body. The at least one controller is configured to receive the scan of the interior surface of the dump body and determine a type of dump body by comparing the scan of the interior surface of the dump body with at least one scan of an interior surface of a known dump body.

12 Claims, 6 Drawing Sheets

(56) References Cited

U.S. PATENT DOCUMENTS

| | | | |
|---|---|---|---|
| 2016/0225106 A1* | 8/2016 | Shike | E02F 9/26 |
| 2017/0372534 A1* | 12/2017 | Steketee | E02F 9/2054 |
| 2018/0179732 A1* | 6/2018 | Bartsch | E02F 9/205 |
| 2020/0239244 A1* | 7/2020 | Hendricks | E02F 9/262 |
| 2020/0240112 A1* | 7/2020 | Hendricks | G06Q 50/08 |
| 2020/0241561 A1* | 7/2020 | Hendricks | G06Q 10/00 |
| 2020/0325655 A1* | 10/2020 | Hageman | E02F 3/3486 |
| 2020/0392703 A1* | 12/2020 | Sherlock | G01F 15/068 |
| 2021/0239808 A1* | 8/2021 | Friend | G01S 17/42 |
| 2022/0130063 A1* | 4/2022 | Thomas | E02F 9/261 |
| 2023/0089883 A1* | 3/2023 | Peat | B65G 67/24 |
| | | | 414/517 |

FOREIGN PATENT DOCUMENTS

| | | |
|---|---|---|
| JP | 09033326 | 2/1997 |
| JP | 6357457 | 6/2018 |

* cited by examiner

IDENTIFY CARRYBACK IN UNKNOWN TRUCK BED

TECHNICAL FIELD

The present disclosure relates to a haul truck. More particularly, the present disclosure relates to detecting and calculating carryback in a dump body of a haul truck.

BACKGROUND

Machines such as haul trucks or haul machines are used in various industries to transport or move material from one location to another. When using a haul truck to haul material, under certain conditions, some of the material may adhere or stick to the interior surface of the dump body of the haul truck after each dumping operation. The material remaining in the dump body may be referred to by different terms such as carryback, residual load, or dead bed.

Carryback material remaining in the dump body is undesirable because it reduces machine productivity. More specifically, carryback material reduces the effective capacity (e.g., volume) of the dump body, thus, requiring a greater number of haul cycles to move a desired amount of material from the loading site to the dumpsite or a misunderstanding of the amount of material hauled. Further, where haul trucks are loaded based on their volumetric carrying capacity, the truck can be overloaded. The increased weight of the dump body due to carryback material can overload the haul trucks, increasing the axle loads to roadways, and/or reducing the fuel efficiency of the haul trucks. Each of the above-mentioned issues decreases the efficiency of the material moving process and can cause damage or excessive wear to the roadways or the haul truck itself.

U.S. Patent Application US20180179732A1 to Barsch et al. and filed on Dec. 22, 2016, discloses a payload optimization system that includes one or more visual sensors coupled to a hauling machine and configured to scan and produce a payload body data set. The system may further include a loading machine including a payload bucket configured to load a payload into the payload body. Moreover, a loading system controller may be communicably coupled to each of the hauling machine and the loading machine and configured to identify the hauling machine and the loading machine using a set of machine identifiers. Moreover, the controller may receive the payload body data set from the one or more visual sensors, generate a payload body map, and program a loading sequence of the payload body based on the payload body map. The loading system controller may transmit and display the loading sequence configured to guide a loading cycle between the hauling machine and the loading machine.

SUMMARY OF THE INVENTION

In one example, a system for detecting carryback within a dump body of a haul truck may include at least one camera and at least one controller. The at least one camera may be configured to generate a scan of an interior surface of the dump body. The at least one controller may be configured to receive the scan of the interior surface of the dump body and determine a type of dump body by comparing the scan of the interior surface of the dump body with at least one scan of an interior surface of a known dump body.

In another example, a method for calculating carryback of a dump body of a haul truck may include comparing a scan of the interior surface of the dump body taken by a camera with at least one scan of a known dump body. The method may also include determining a type of dump body captured by the camera when the scan of the interior surface of the dump body matches one of the at least one scan of an interior surface of a known dump body.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
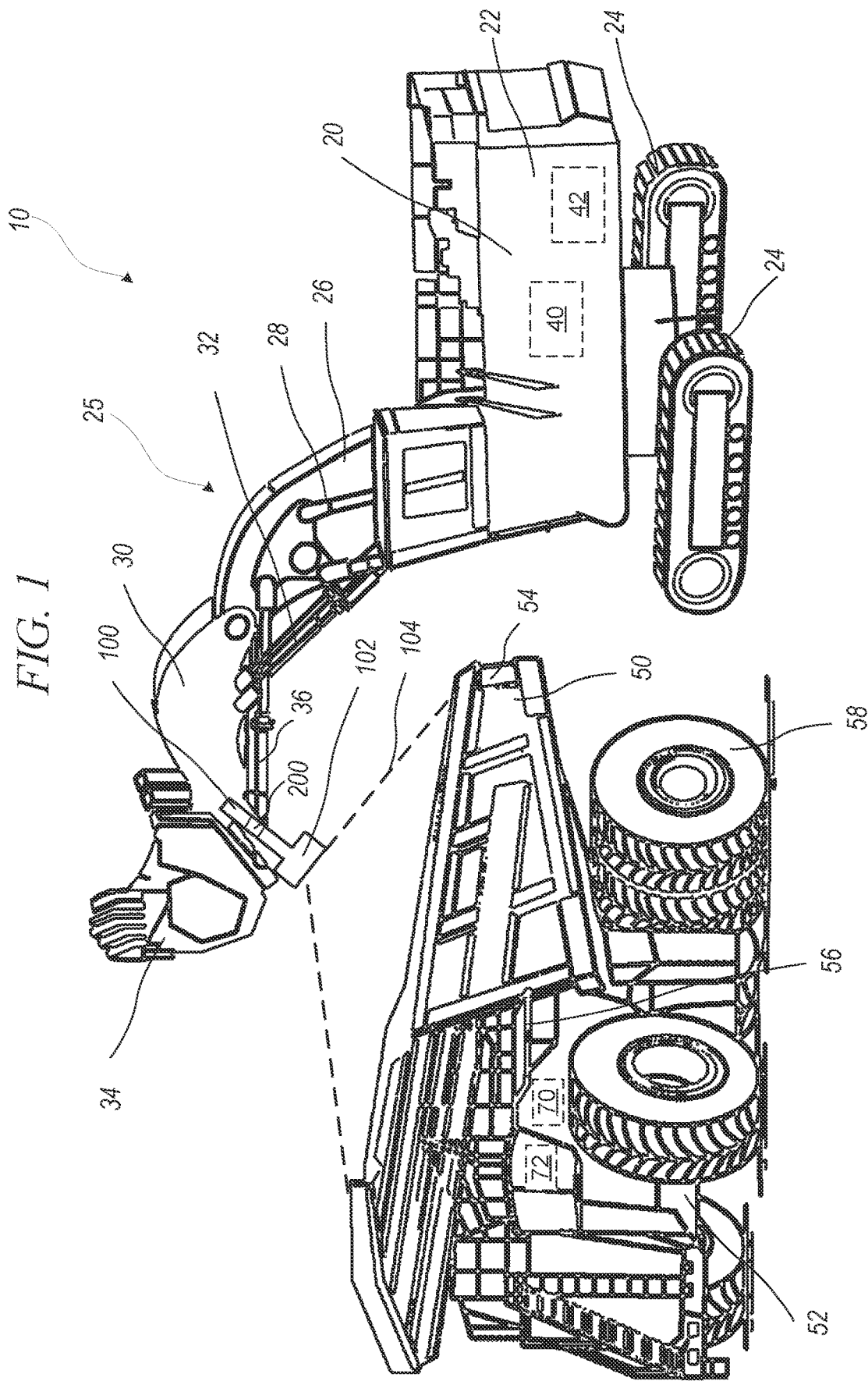
FIG. 1 is a perspective view of a system scanning a dump body of a haul truck.

FIG. 1 is a perspective view of a system 100 scanning a dump body 54 of a haul truck 50. A job site 10 may include multiple locations designated for particular purposes. For example, the job site 10 can include a load location (not shown), where at least one excavator 20 (hereinafter "excavator 20") can load one or more haul trucks 50 (hereinafter "haul truck 50") with material. The job site 10 can also include one or more dump locations (not shown) where the haul truck 50, with or without the help of the excavator 20, can unload material carried by the haul truck 50. In another example, the haul trucks can be loaded or unloaded at a location that is not on the job site 10.

The excavator 20 can be configured to load or unload the haul truck 50. The excavator 20 can include a platform 22, at least one ground-engaging unit (hereinafter "ground-engaging unit 24"), and a digging and dropping system 25. In one or more examples, the excavator 20 can be any type of machine used for digging material on a jobsite.

The platform 22 can be configured to hold an operator of the excavator 20 that controls the excavator 20. As shown in FIG. 1, the platform 22 can extend longitudinally between and away from the ground-engaging units 24. The ground-engaging units 24 and the digging and dropping system 25 can be attached to the platform 22.

The ground-engaging units 24 can be configured to move the excavator 20 in forward and backward directions along the ground surface. As shown in FIG. 1, the ground-engaging units 24 can be tracked assemblies or crawlers. In another example, the ground-engaging units 24 can be wheels, such as inflatable or hard tires, or any other ground-engaging device used for navigating construction vehicles.

The digging and dropping system 25 can be configured to dig up and drop material on the job site 10. The digging and dropping system 25 can include a boom 26, a stick member 30, bucket 34, and a bucket cylinder 36.

The boom 26 can attach to and extend from the platform 22. The boom 26 can mechanically couple the platform 22 and the stick member 30. The boom 26 can include at least one boom cylinder 28 (hereinafter "boom cylinders 28"). The boom cylinders 28 can be attached to the boom 26 on one end and attached to the platform 22 on the other end. The boom cylinders 28 can expand and retract to move the boom 26 in relation to the platform 22.

The stick member 30 can be pivotally attached to the boom 26. The stick member 30 can extend from the boom 26. The stick member 30 can mechanically couple the boom 26 and the bucket 34. The stick member 30 can include at least one stick member cylinder 32 (hereinafter "stick member cylinder 32"). The stick member cylinder 32 can attach to the stick member 30 on one end and attach to the boom 26 on another end. The stick member cylinders 32 can expand and retract to move the stick member 30 in relation to the boom 26.

The bucket 34 can be configured to pierce the surface and pick up the material on the job site 10. The bucket 34 can be pivotally attached to the stick member 30 opposite from where the stick member 30 attaches to the boom 26. The bucket 34 can include at least one bucket cylinder 36 (hereinafter "bucket cylinders 36"). The bucket cylinders 36 can attach to the stick member 30 on one end and attach to the bucket 34 on another end. The bucket cylinders 36 can expand and retract to move the bucket in relation to the stick member 30.

The boom 26, the boom cylinders 28, the stick member 30, the stick member cylinders 32, the bucket 34, and the bucket cylinders 36 can be controlled by the operator using an operator controller (not shown) to move the position of the bucket 34 and pick up and drop a material.

The platform 22 can include a power source 40. The power source 40 can be provided in any number of different forms including, but not limited to, internal combustion engines, electric motors, hybrid engines, or any power source used to power construction equipment. Power from the power source 40 can be transmitted to various components and systems of the excavator 20, such as the ground-engaging units 24 or the digging and dropping system 25.

The excavator 20 can be controlled by one or more controllers (hereinafter "controller 42"). The controller 42 can include one or more processors, microprocessors, microcontrollers, electronic control modules (ECMs), electronic control units (ECUs), programmable logic controller (PLC), or any other suitable means for electronically controlling functionality of the excavator 20.

The haul truck 50 can be configured to haul and unload material on or off of the job site 10. The haul truck 50 can include a frame 52, a dump body 54, a platform 56, and ground-engaging units 58.

The frame 52 can be configured to provide structural support and rigidity to the other components of the haul truck 50. For example, the dump body 54, the platform 56, and the ground-engaging units 58 can all be attached to the frame 52. Thus, the frame 52 can be exposed to many stresses and strains while the haul truck 50 is filled, haul truck 50 navigates around the job site 10 or off of the job site 10, and while the haul truck 50 is unloaded.

The dump body 54 can be configured to receive material from the excavator 20 or any other piece of equipment that can load material into the dump body 54. The dump body 54 can be attached to at least one haul body cylinder (not shown). The dump body 54 can be pivotally attached to the frame 52. The haul body cylinders can be attached to the frame 52 and the dump body 54 such that when the haul body cylinders expand the dump body 54 can rotate about their connection to the frame 52 to tip the dump body 54 upward, and when the haul body cylinders retract, the dump body 54 can rotate about their connection to the frame 52 to level out the dump body 54 with the frame 52.

The ground-engaging units 58 can be configured to move the haul truck 50 in forward and backward directions along the ground surface. As shown in FIG. 1, the ground-engaging units 58 can be wheels, such as inflatable or hard tires. In another example, the ground-engaging units 58 can be tracked assemblies or crawlers, or any other ground-engaging device used for navigating construction vehicles.

The platform 56 can be configured to hold an operator of the haul truck 50 and controls (e.g., human machine interface) that control the haul truck 50. As shown in FIG. 1, the platform can extend longitudinally between and away from the ground-engaging units 58. The platform 56 can include a power source 70 and a controller 72.

The power source 70 can be configured to power various components of the haul truck 50. The power source 70 can be provided in any number of different forms including, but not limited to, internal combustion engines, electric motors, hybrid engines, or any power source used to power construction equipment. Power from the power source 70 can be transmitted to various components and systems of the haul truck 50, such as the ground-engaging units 58 or the haul body cylinders 60.

The controller 72 can be configured to control various components of the haul truck 50. The controller 72 can include one or more processors, microprocessors, microcontrollers, electronic control modules (ECMs), electronic control units (ECUs), programmable logic controller (PLC), or any other suitable means for electronically controlling functionality of the haul truck 50.

As shown in FIG. 1, a system for measuring carryback (hereinafter "system 100") can be used on the job site 10 or other locations such as between a loading location and a dumping location, for example. The system 100 can be configured to identify a type of dump bed, calculate an amount of carryback in the dump bed, and update an accounting of material moved on the job site 10. The system 100 can include at least one scanning device 102 such as a 3D scanner, camera, or other device for capturing three-dimensional information about the interior of the dump body. As shown in FIG. 1, the scanning device 102 can be installed on the boom 26 of the excavator 20 such that the scanning device 102 can have the dump body 54 within a field of view 104. In one or more examples, the scanning device 102 can be installed on the stick member 30 of the excavator 20 such that the scanning device 102 can have the dump body 54 within a field of view 104. In yet another example, the scanning device 102 can be installed anywhere else on the excavator 20, such that the scanning device 102 can have the dump body 54 within a field of view 104. The scanning device 102 and the field of view 104 will be discussed in more detail below with relation to FIG. 4.

Figure 2:
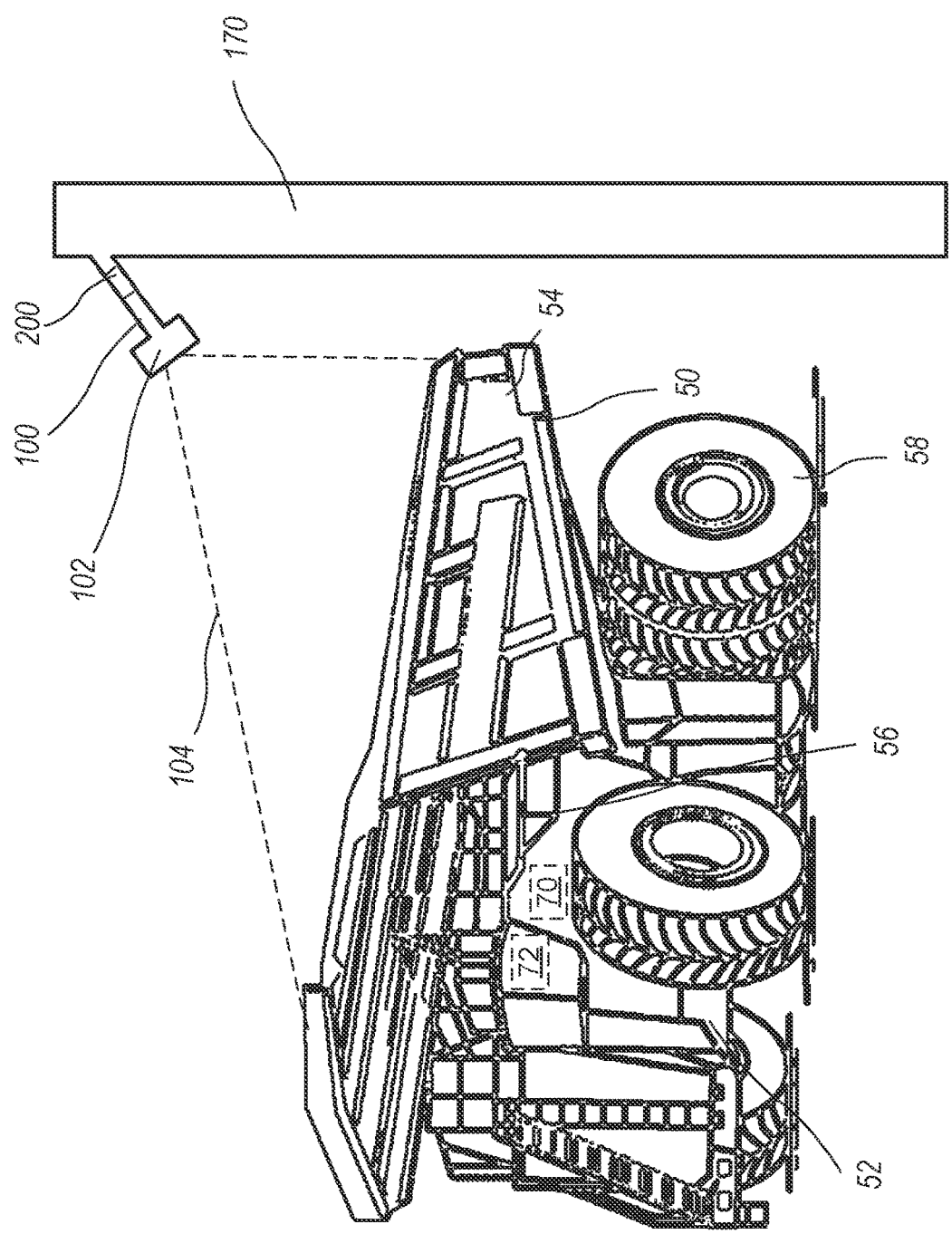
FIG. 2 is a perspective view of a system scanning a dump body of a haul truck.

FIG. 2 is a perspective view of the scanning device 102 of the system 100 scanning the dump body 54 of the haul truck 50. As shown in FIG. 2, the scanning device 102 can be mounted on post 170 (e.g., in addition to or as an alternative to a scanning device installed on the excavator). In one or more examples, the post 170 may be tall enough such that the scanning device 102 can have the dump body 54 of the haul truck 50 within the field of view 104 when the haul truck 50 parks, drives, or otherwise passes under or by the scanning device 102. In one or more examples, the post 170 can be located on the job site 10. In another example, the post 170 can be located off the job site 10, in any location that the haul truck 50 can drive. For example, the post 170 can be located on a side of a road or other pathway of one or more haul trucks. In one or more examples, the post 170 may be positioned a set distance away from the job site 10, such that drivers can get their truck scanned by the scanning device 102 and the system 100 can alert the job site that the haul truck (e.g., haul truck 50) is near the job site 10 (e.g., leaving or approaching).

Figure 3:
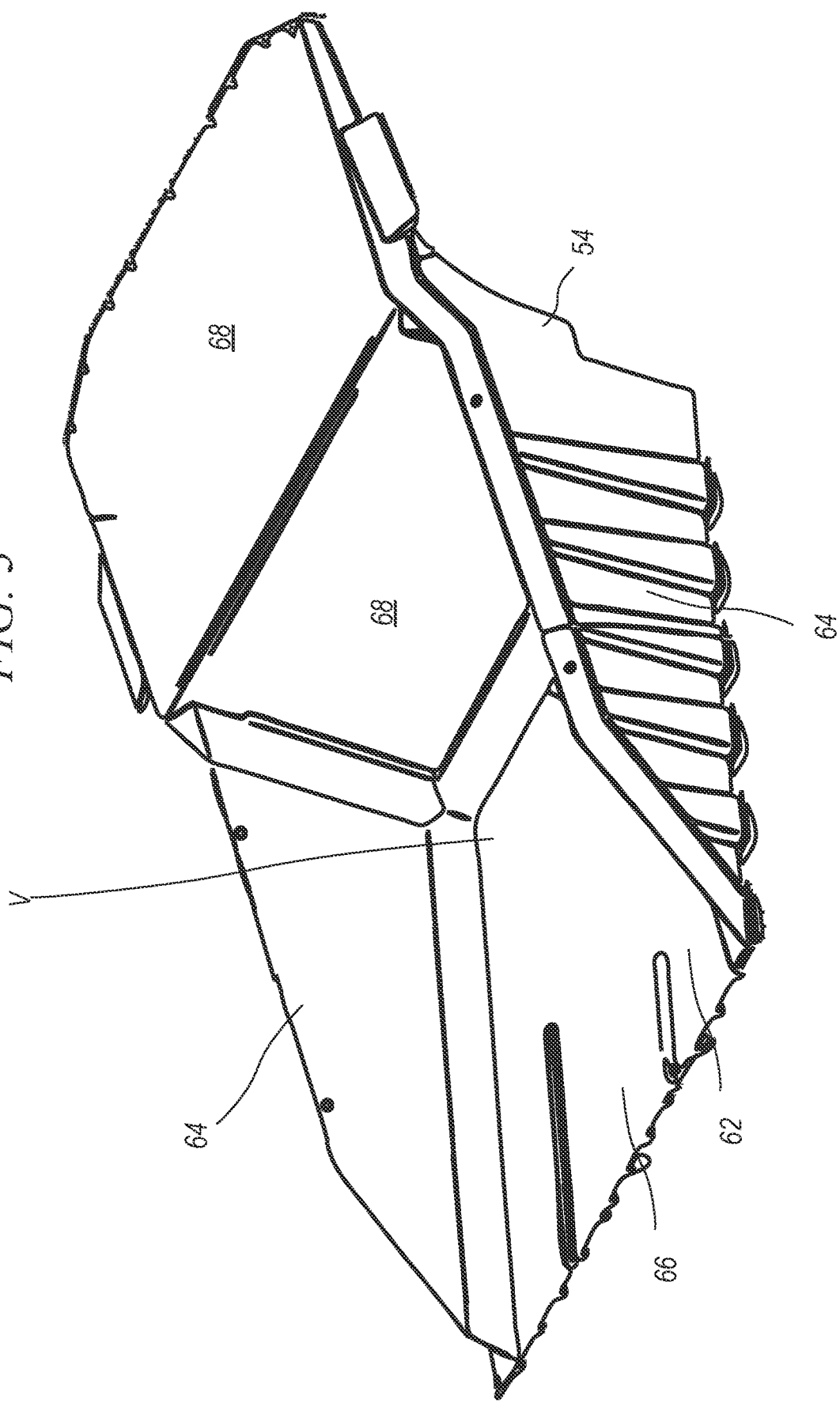
FIG. 3 is a perspective view of a dump body of a haul truck.

FIG. 3 is a perspective view of the dump body 54 of the haul truck 50. The dump body 54 can include an interior surface 62, at least one sidewall 64 (hereinafter "sidewalls 64"), a floor 66, and a truck wall 68. As shown in FIG. 3, each of the sidewalls 64 can extend from opposite ends of the floor 66. The truck wall 68 can extend from the floor at an end that is nearest a haul truck (not shown). Thus, the truck wall 68 can be configured to extend away from the floor 66 until it reaches a height of the sidewalls 64, and then extend away from the sidewalls 64 to help protect the platform 56 of the haul truck 50. The interior surface 62 is defined by the sidewalls 64, the floor 66, and the truck wall 68. The interior surface 62 can define a volume V of the dump body 54.

The dump body 54 show in FIG. 3 is just one example of a dump body. However, dump bodies come in all different shapes and sizes. In one or more examples, a dump body can have higher or shorter sidewalls. In one or more examples, a dump body can have a higher or shorter truck wall. In one or more examples, a dump body can have a longer or a shorter floor. In one or more examples, a dump body can combine any of the combinations of higher or shorter sidewalls, higher or shorter truck wall, or a longer or shorter floor. Thus, as one or more of these dump body parameters change, an interior surface and volume of the dump body can also change. Therefore, the system 100 (shown in FIGS. 1 and 2, and discussed in further detail below) can be able to detect a dump body type and determine a volume V thereof. Still further, while dump bodies of haul trucks are contemplated and shown, carryback can occur in a variety of other devices and systems.

In one or more examples, the system 100 may be configured to identify any type of truck and define a set of criteria for determining geometric parameters of the dump body to compare to one or more stored scans and find carryback within the dump body.

Figure 4:
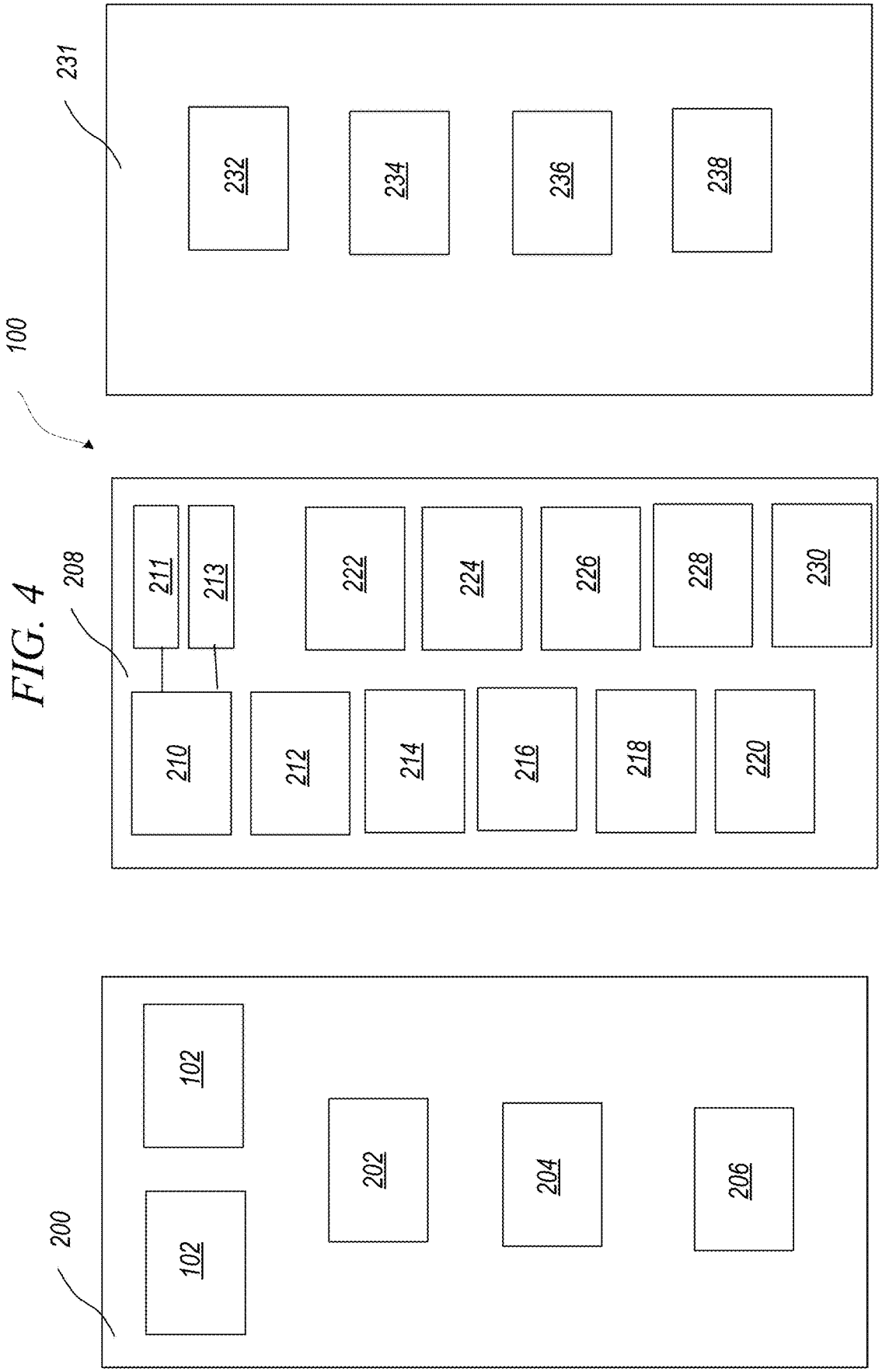
FIG. 4 is a schematic diagram of a system to detect carryback in a dump body of a haul truck.

FIG. 4 is a schematic diagram of the system 100 used to detect carryback in the dump body 54 (FIGS. 1-3) of the haul truck 50 (FIGS. 1-2). The system 100 can include a first controller 200, a second controller 208, and a computer 231. In one or more examples, the first controller 200, the second controller 208, and the computer 231 can be combined in various combinations. For example, the first controller 200 and the second controller 208 can be combined to interact with the computer 231. In another example, the first controller 200 can be combined with the computer 231 to interact with the second controller 208. In yet another example, the second controller 208 can be combined with the computer 231 to interact with the first controller 200.

The first controller 200 can include one or more processors, microprocessors, microcontrollers, electronic control modules (ECMs), electronic control units (ECUs), programmable logic controller (PLC), or any other suitable means for processing image or three-dimensional data captured by the scanning device 102 and communicated to the second controller 208 and the computer 231. The first controller 200 may include a storage medium or memory accessible by the controller 200, for example, in the form of a floppy disk, hard drive, optical medium, random access memory (RAM), read-only memory (ROM), or any other suitable computer-readable storage medium commonly used in the art (each referred to as a "database"), which can be in the form of a physical, non-transitory storage medium. As shown in FIGS. 1 and 2, the first controller 200 can be installed within the system 100. In one or more examples, the first controller 200 can be a controller onboard the excavator 20 (e.g., controller 42 (shown in FIG. 1)). In the case of the scanning device 102 being arranged on a post 170, the controller 200 may be present on the post 170 or at a back office location, for example.

The first controller 200 can be in electrical communication with one or more scanning devices 102. In one or more examples, the first controller 200 can be in electrical communication with two scanning devices 102. The scanning device 102 can be configured to capture images (motion (i.e., continuous video images), stationary (i.e., photos taken at a set frequency)) or three-dimensional data within the field of view 104 and communicate those images and/or data back to the first controller 200. In one or more examples, the scanning device 102 can be a stereo camera (i.e., 2 monochrome and 1 color camera modules). In another example, the scanning device 102 can be any other kind of camera that can be used to detect carryback within the dump body of a dump truck. In still other examples, the scanning device 102 can include a three-dimensional scanner or other surface capturing system.

Each scanning device 102 can define a field of view 104. To increase or decrease the field of view 104, the scanning device 102 can be adjusted (e.g., moved farther or closer to the objects) or more scanning devices 102 can be added to increase the total field of view 104 of the system 100. In even more examples, the scanning device 102 can be adjusted to increase the field of view 104. For example, a lens (not pictured) of the scanning device 102 can be added (or changed) to the scanning device 102 to increase the width of the field of view 104. There are many other alterations (zoom, focal point adjustments, etc.) that can be made to the scanning device 102 to improve the field of view 104 and/or adjust the clarity, accuracy, and/or precision of the captured imagery or data.

In the examples shown in FIGS. 1 and 2, one scanning device 102 can be installed on the boom (e.g., the boom 26) of the excavator (e.g., the excavator 20). In another example, one of the scanning device 102 can be installed on the boom (e.g., the boom 26), and another of the scanning device 102 can be installed on the stick member (e.g., the stick member 30) of the excavator (e.g., the excavator 20). In yet another example, one or two of the scanning devices 102 can be installed on the boom and/or the stick member of the excavator. In one or more examples, any number of scanning devices 102 can be added to the boom or the stick member of the excavator to provide the quality of images captures and to improve the view 104. Additionally or alternatively, one or more scanning devices 102 can be installed on one or more posts 170.

The first controller 200 can also include a vision processing electronic control module 202. The vision processing electronic control module 202 can be configured to receive the captured images or data from any and/or all of the scanning devices 102 and process the captured images or data for transmission to the second controller 208 and the computer 231. The vision processing electronic control module 202 can be in communication with any of the scanning devices 102 of the system 100 to receive and aggregate the captured images or data from the various scanning devices 102. The vision processing electronic control module 202 can also be electrically connected to a gateway electronic control module 204.

The gateway electronic control module 204 can enable the communication of the aggregated captured images or data from the vision processing electronic control module 202 to a modem 206. Thus, the gateway electronic control module 204 can enable the aggregated captured images or data to be wirelessly communicated via the modem 206 to any of the second controller 208 and the computer 231.

The second controller 208 can include one or more processors, microprocessors, microcontrollers, electronic control modules (ECMs), electronic control units (ECUs), programmable logic controller (PLC), or any other suitable means for processing image or three-dimensional data communicated from the first controller 200 or the computer 231. The second controller 208 may include a storage medium or memory accessible by the second controller 208, for example, in the form of a floppy disk, hard drive, optical medium, random access memory (RAM), read-only memory (ROM), or any other suitable computer-readable storage medium commonly used in the art (each referred to as a "database"), which can be in the form of a physical, non-transitory storage medium. The second controller 208 can be configured, at least, to receive the aggregated captured images or data from the first controller 200, process the aggregated captured images or data, identify a type of dump body captured in the images, complete an accounting based on the processed aggregated captured images or data, and communicate with the first controller 200 and the computer 231. The second controller 208 can process the aggregated captured images from the first controller 200 into known scans of known dump bodies of known haul trucks. As discussed above, the second controller 208 can include a computer-readable storage medium, the computer-readable storage medium may store a variety of information types including: baseline model repository 210, a truck id list 212, a driver id list 214, a driver app location 216, an excavator ID 218, a trigger threshold data 220, scan comparator algorithms 222, a truck type list 224, a truck type three-dimensional computer-aided design models (hereinafter "truck type 3D CAD models 226"), an inventory management program 228. The second controller 208 can also include a modem 230.

The baseline model repository 210 can be configured to store known scans of known truck body types. The aggregated scans of known dump bodies and haul trucks from the second controller 208 can be stored in the baseline model repository 210 and used as reference scans for other operations performed by the second controller 208. Further, the second controller 208 can update the stored scans in the baseline model repository 210 if a known dump body has a scan resulting in a higher or lower volume than the previous baseline scan. Each scan stored in the baseline model repository 210 can be identified by a truck identification pin 211 or a driver identification pin 213.

The truck id list 212 can be configured to store information about one or more trucks that drive on the job site 10 (FIG. 1). The truck identification pin 211 of the trucks can be stored on the truck ID list 212. As a truck navigates the job site 10, the system 100 can store all information (e.g., a truck location, an amount of material moved by truck, a time the truck has been on the jobsite, or any other information related to the truck on the job site) on the second controller 208.

The driver id list 214 can be configured to store information about one or more drivers that drive on the job site 10. The driver identification pin 213 of drivers can be stored in the driver ID list 214. As the driver navigates the job site 10, the system 100 can store all information (e.g., a driver location, an amount of material moved by the driver, a time the driver has been on the jobsite, or any other information related to the one or more drivers on the job site) on the second controller 208.

The driver app location 216 can be configured to store a location of a driver on or off the job site 10. In one or more examples, the location of the driver can be shared with the second controller 208 via the computer 231. In another example, the location of the driver can be shared with the second controller 208 by one or more controllers on the haul truck or other work machine (e.g., the controller 72 onboard the haul truck 50). The second controller 208 can use the location of the driver to automatically alert other equipment operators (e.g., an operator of the excavator 20) when the haul truck is ready to be loaded or unloaded.

The excavator ID 218 can be configured to store information about one or more excavators on the job site 10. The information stored in the excavator ID 218 can include loading capacity (e.g., size of the boom and the bucket), and locations of the excavators.

The trigger threshold data 220 can be collected and stored for each type of dump body to signal to the second controller 208 when carryback is detected, a new scan of the dump body should be performed, or a new baseline should be stored in the baseline model repository 210. The trigger threshold data 220 can include various geometries of the dump body. For example, the trigger threshold data 220 can be a length of a floor or a height of a sidewall of the dump body. In another example, the trigger threshold data 220 can be a volume of an interior surface (e.g., interior surface 62 of the dump body 54). In yet another example, the trigger threshold data 220 can be any other parameter that can be detected by the system 100 that can signal that carryback is detected, or that the system 100 needs to be updated. In one or more examples, the trigger threshold data 220 includes a surface profile of an interior surface of a dump body.

The trigger threshold data 220 may be set for any data collected on the dump body of the haul truck. In some examples, the trigger threshold data 220 may account for noise and/or inaccuracies in the measurement system. Thus, the trigger threshold data 220 may be set at a value above the known variation in the system. For example, if the system has a known error of five percent, the trigger threshold data 220 can be set to any measurement above five percent. In one or more examples, the system 100 may use a flatness score of an interior surface of the dump body. The system 100 may analyze previous scans or models of the truck body to define boundaries of a piece of planar geometry. In one or more examples, a neural network, or a machine learning system may be used to automatically detect and define boundaries of a piece of planar geometry on the dump body of the dump truck. The system 100 may take a known image of an empty dump body and a scan captured by the system and generate a point cloud map of the stored image and the scan captured by the system. A defined area of each of the point cloud maps may be rectified such that the plane is in line with an XY plane. Therefore, a height difference between the highest and lowest points of the point cloud map of the known image of an empty dump body and the scan captured by the system may be a flatness score of the XY plane. Thus, the trigger threshold data 220 can be configured to reduce false alarms of detecting carryback and/or determining a new baseline scan is required.

The truck type list 224 can be configured to store a list of known truck types (e.g., dump bodies with recognized interior surface shapes) stored in the second controller 208. The truck type list 224 can be sent to another controller (e.g., first controller 200, computer 231, or any other controller that is in wireless communication with the system 100) to share the stored truck types. For example, if the system 100 scans a dump body and does not recognize the truck type, the system 100 can prompt a driver to select their dump body type from the truck type list 224.

The truck type 3D CAD models 226 can be stored on the second controller 208 as models of known dump body types. In one or more examples, the truck type 3D CAD models 226 can include truck types from known manufacturers or their partners. In one or more examples, a 3D model can be created of a new truck. In another example, a new truck, which is not a known truck type, can be 3D modeled and added to the truck type 3D CAD models 226. The truck type 3D CAD models 226 can provide exact, substantially exact, and/or relatively accurate dimensions of a dump body of a haul truck per a 3D CAD model. In one or more examples, exact dimensions may be accurate to a same or similar level as the manufacturing tolerances of the CAD models or manufacturing drawings, for example. The dimensions of the 3D CAD models stored in the truck type 3D CAD models 226 can be used by the scan comparator algorithms 222.

The scan comparator algorithms 222 can be executed to compare a scan captured from a first controller (e.g., first controller 200) with a known scan stored on a database (e.g., baseline model repository 210 or the truck type 3D CAD models 226). The scan comparator algorithms 222 can include a neural network to continually compare a new scan from a first controller with a known scan previously stored on the system 100. Neural networks can be statistical analysis algorithms that compare frequencies of different object primitives to define an input and/or output correlation. Therefore, the system 100 may capture images of different truck types and label the captured images with a boundary of truck, images, and labels of various truck types. As the neural network receives and analyzes more and more trucks, the neural network can generate matrix of weights. For example, the neural network may generate coefficients in a massive n-dimensional curve fit. The dimensional curve fits of the known images or scans may then be compared against unlabelled data to determine if a target accuracy of the neural network has been achieved. In examples, neural networks may be configured for specific tasks. For example, neural networks may be configured for image recognition. A neural network configured for image recognition may be able to analyze custom data sets (e.g., labeled pictures of machines, or dump bodies) and may perform specific tasks (e.g., identify a type of machine or dump body in a picture, outline a segment of an image that shows a dump body of a dump truck.

In another example, the scan comparator algorithms 222 can compare a new scan with a computer-aided design (CAD) model of a known dump body. If a known scan or a known 3D CAD model matches the truck type, the scan comparator algorithms 222 can determine a difference in volume (e.g., the volume V of FIG. 3) of the scanned dump body and the scan of the known dump body or the known 3D CAD model. If no CAD model is available, the scan comparator algorithms 222 can include a bilateral comparator secondary test and a flatness comparator secondary test.

The bilateral comparator secondary test of the scan comparator algorithms 222 may use a neural network to divide the scanned area in half along a length of the floor of the truck body and compare each half of the divided scanned area to the other half of the divided scanned area. In some examples, as discussed above, the neural network may analyze a captured image of a dump body and determine an area of the captured image that corresponds to a dump body of a haul truck. The area that corresponds to a dump body of a haul truck may be extracted from a disparity map as a 3D point cloud and rectified to an XY plane. The neural network may then divide the 3D point cloud along a center by a y axis and compare a height of each point on one half to a height of the corresponding point of each point from the other half. If the difference between the divided scanned areas exceeds a threshold value stored in the trigger threshold data 220 the second controller 208 can identify the dump body as containing carryback and/or flag the dump body for scrapeout.

The flatness comparator secondary test of the scan comparator algorithms 222 can identify geometric features of the dump body (e.g., corners, planes, or intersections) and calculate a flatness score for each planar feature (e.g., the floor 66, the sidewalls 64, or the truck wall 68). In one or more examples, the system 100 may use a neural network to analyze a scan for a flatness score. For example, a neural network can take a captured image and define planes on an interior of the dump body. The neural network can then make a 3D cloud map on the planes, and rectify the 3D cloud map on an XY axis. The neural network can then compare the maximum and minimum height values to generate a flatness score for each of the planes of the interior of a dump body of the haul truck. If the flatness score of any of the planar features of the dump body is greater than a maximum threshold value, or less than a negative threshold value, stored in the trigger threshold data 220 the second controller 208 can identify the dump body as containing carryback and/or flag the dump body for scrape out.

Therefore, by comparing two scans, comparing a scan and a 3D CAD model, the bilateral comparator secondary test, or the flatness comparator secondary test, the scan comparator algorithms 222 can predict carryback is present in the dump body of a dump truck.

The inventory management program 228 can be configured to receive inputs from various systems of the system 100. For example, the inventory management program 228 can use the baseline model repository 210, the truck id list 212, the driver id list 214, the driver app location 216, and the excavator ID 218 to track the location of equipment on the job site 10 and calculate a theoretical amount of material moved by the machines. The inventory management program 228 can also use the trigger threshold data 220, the scan comparator algorithms 222, the truck type list 224, and the truck type 3D CAD models 226, to automatically remove a calculated volume of the carryback from the theoretical amount of material moved by the machines to more accurately account for material on the job site 10. In one or more examples, the inventory management program 228 can also alert an excavator (e.g., the excavator 20) that carryback is within a haul truck (e.g., the haul truck 50) to prevent the excavator from overloading the haul truck. Thus, inventory management system 228 can help ensure haul trucks are not overloaded (e.g., are within the Department of Transportation weight limits) before leaving the job site 10.

The modem 230 can be configured to allow the second controller 208 to wirelessly communicate with the first controller 200 and the computer 231. The modem 230 can include a gateway control module that can allow aggregated information to be shared between the second controller 208 and other controllers or computers of the system 100.

The computer 231 can be configured to help a driver of a truck communicate with other components of the system 100. The computer 231 can be a cell phone, tablet, laptop, or any other kind of computer that can be located within a truck, or on the job site 10 that a driver can access to communicate with other components of the system 100. For example, the driver can communicate with the second controller 208 to provide a driver ID, a truck ID, and a position of the truck they are driving. For example, the computer 231 can include a driver ID 232, a truck ID 234, a location 236, and a modem 238.

The driver ID 232 can be configured to communicate a unique identification of the driver to the second controller 208 so that the second controller 208 can download and upload information regarding the driver. The driver ID 232 can be assigned to the driver before the driver enters the job site (e.g., the job site 10) for the first time, or as the driver enters the job site for the first time.

The truck ID 234 can be configured to communicate a unique identification of the truck to the second controller 208 so that the second controller 208 can download and upload information regarding the truck. Since drivers can drive multiple trucks, the truck ID 234 can also be tracked. The truck ID 234 can be assigned to a truck either before the first time the truck drives on the job site or after the truck drives on the job site.

The location 236 can be the location of the computer at any giving time. The location 236 can be measured by a global positioning sensor or some other location device. The location 236 can communicate the location of the computer 231 whether the computer 231 is on the job site, or off the job site.

The modem 238 can be configured to allow the computer 231 to wirelessly communicate with the first controller 200 and the second controller 208. The modem 238 can include a gateway control module that can allow aggregated information to be shared between the computer 231 and other controllers or computers of the system 100.

In one or more examples, the first controller 200 and the second controller 208 can communicate job information to the computer 231. For example, the second controller 208 can communicate an amount of payload loaded into the haul truck 50, and an amount of time that it took to load the haul truck 50. In another example, the second controller 208 can communicate a total amount of payload moved by the dump truck 50 on the job site 10. In yet another example, any of the information on the first controller 200 and the second controller 208 can be shared with the computer 231.

INDUSTRIAL APPLICABILITY

In one or more operating examples of the disclosed system, the system 100 can include a truck onboarding program 500 and a carryback detection program 600.

Figure 5:
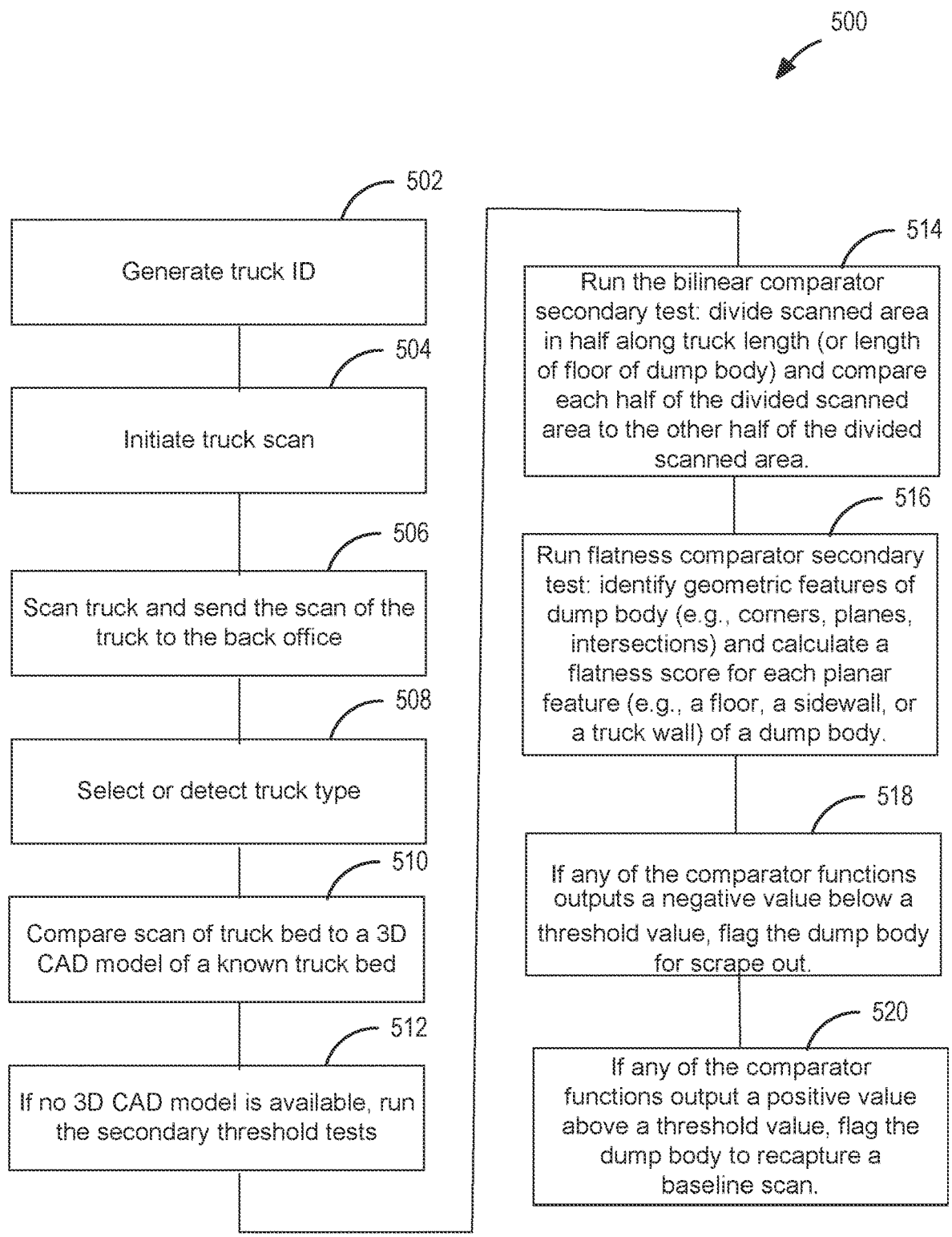
FIG. 5 is a flowchart showing a method of setting up a new dump body.

FIG. 5 is a flowchart showing the truck onboarding program 500. When a new truck (e.g., the haul truck 50) enters a job site (e.g., the job site 10), the system 100 can run the truck onboarding program 500. The truck onboarding program 500 is configured to gather and communicate information to one or more controllers so the information can be stored or used in various calculations while the truck is on the job site. In one example, the onboarding program 500 can be installed on a back-office controller (e.g., the second controller 208). In another example, the onboarding program 500 can be installed on machinery (e.g., a controller on an excavator, truck, or any other machine on a job site).

At step 502, the program can generate a new truck ID for a new truck on the job site. The new truck ID is a unique truck ID that can be tied to the truck for the life of the truck or during the presence of the truck on the job site. The new truck ID can be attached to any additional information that is collected by the truck onboarding program 500.

At step 504, the program can initiate a truck scan. In one example, the controller (e.g., the second controller 208) can wirelessly communicate with another controller (e.g., the first controller 200), to capture a scan of a dump body of the truck. As discussed above, the scan of a dump body can occur by a controller installed on an excavator. In another example, the scan of a dump body can occur by a controller mounted to a post (e.g., post 170). In yet another example, the scan of a dump body can occur by a controller off the job site.

At step 506, the controller (e.g., the first controller 200) can scan the dump body of the truck, the controller can aggregate the scan and wirelessly send the scan to the back office. The back office can store this scan on a database (e.g., the baseline model repository 210) to reference against all future scans. When stored on the baseline model repository 210 the baseline scan will be linked to the truck identification pin (e.g., truck identification pin 211) and the driver identification pin (e.g., driver identification pin 213) of the haul truck and the driver.

At step 508, the back office can compare the scan received from the controller and scans of known truck beds stored in a repository (e.g., the baseline model repository 210) to detect a truck type of the truck scanned by the controller.

At step 510, the controller (e.g., the second controller 208) can compare the scan received of the dump body of the haul truck with 3D CAD models stored on the controller (e.g., the truck type 3D CAD models 226). If a 3D CAD model exists, the controller can run a comparator function (e.g., the scan comparator algorithms 222) to compare the scan of the dump body and the 3D CAD model of the dump body. If there is no 3D CAD model of the dump body type, the controller can use one or more secondary threshold tests.

At step 512, the controller can run the secondary thresholds test (e.g., the bilateral comparator and/or the flatness comparator of the scan comparator algorithms 222). The controller can include a prompt that has an operator, job site supervisor, or an engineer select a bilateral comparator or a flatness comparator secondary test. In another example, the controller can run both a bilateral comparator and a flatness comparator secondary test to combine and/or compare the results. In yet another example, a neural network installed on the controller (e.g., second controller 208) can scan the dump body to find a similar dump body to determine whether a bilateral comparator and/or a flatness comparator secondary test should be run.

At step 514, the controller can run the bilateral comparator secondary test by dividing the scan in half along the length of a floor of the dump body and comparing each half of the divided scan to the other half of the divided scan. The bilateral comparator secondary test can then determine if any carryback is present by detecting differences between the halves of the scan.

At step 516, the controller can run the flatness comparator secondary test by identifying geometric features of the dump body (e.g., corners, planes, or intersections) and calculate a flatness score for each planar feature (e.g., a floor, a sidewall, or a truck wall) of the dump body. The lack of flatness detected by the flatness comparator secondary test can be indicative of carryback being present in a dump body.

At step 518, the controller can send a signal to a computer or a controller on the haul truck (e.g., computer 231) or on the excavator (e.g., first controller 200) that the dump body needs carryback scraped out if a comparator function outputs a volumetric number across a threshold value. In one example, a controller can compare a known scan (or 3D CAD model) to a new scan and the comparator can output a positive value that is above the positive threshold value to indicate carryback is present. In another example, the controller can compare a new scan to a known scan (or 3D CAD model) and the comparator can out a negative value below a threshold value to indicate carryback is present.

At step 520, the controller can send a signal to a computer or a controller on the haul truck (e.g., computer 231) or on the excavator (e.g., first controller 200) that the dump body needs a baseline scan recaptured if a comparator function outputs a positive or negative value above or below a threshold value. For example, if the comparator function compares a known scan to a new scan and the new scan appears to have a larger volume than the known scan the controller can send a signal to the computer or controller on the haul truck or the excavator that the dump body needs a new baseline scan.

Figure 6:
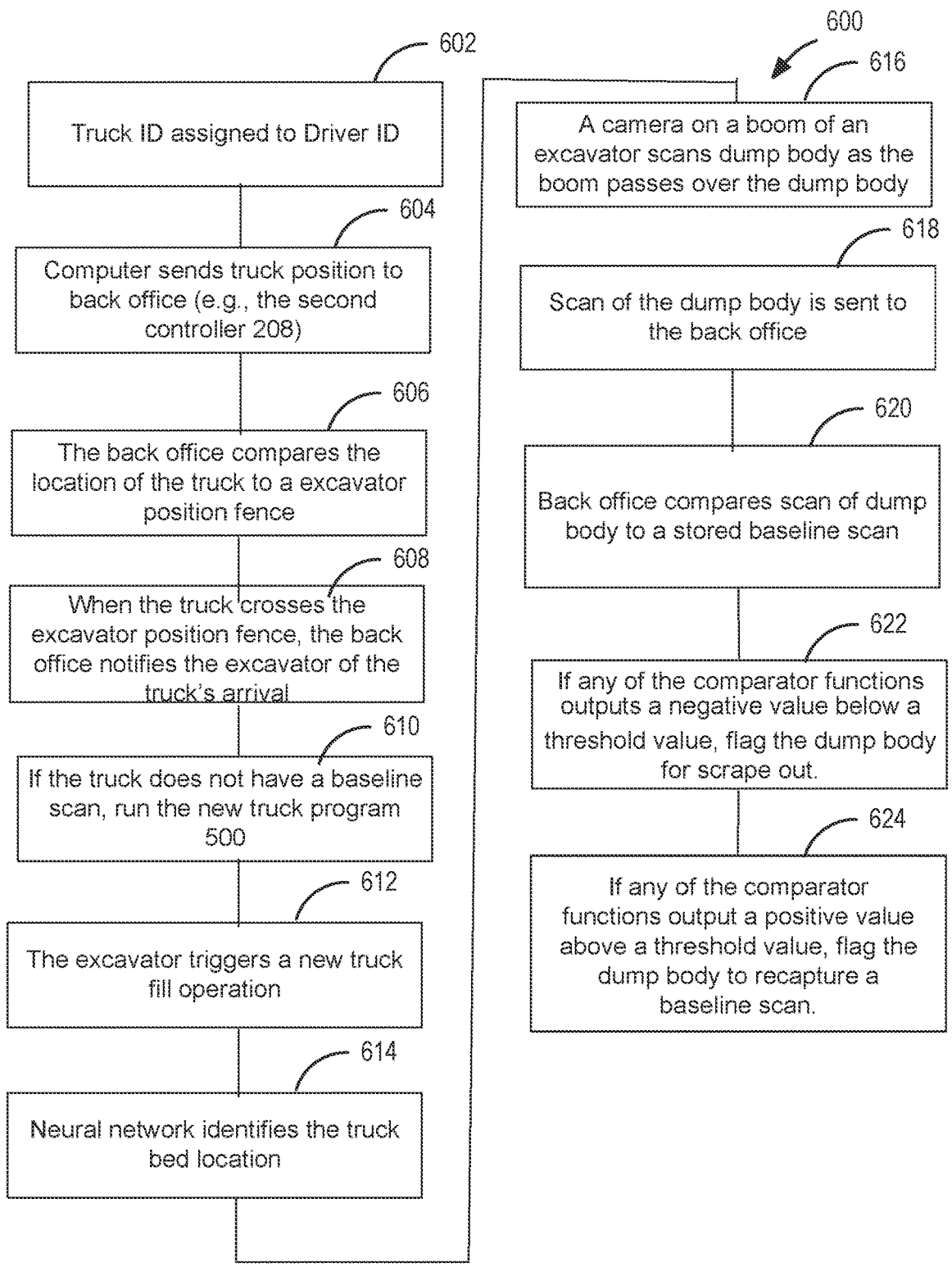
FIG. 6 is a flowchart showing a method of detecting carryback in a dump body.

FIG. 6 is a flowchart showing the carryback detection program 600. The carryback detection program can be configured to detect carryback in a known or a unknown dump body (e.g., the dump body 54) of a haul truck (e.g., the haul truck 50).

At step 602, a computer (e.g., computer 231) can send a truck ID and a driver ID (e.g., truck identification pin 211 and driver identification pin 213) to the back office (e.g., second controller 208). The computer can send the truck ID and driver ID before a haul truck enters the job site, or after the haul truck enters the job site (e.g., the job site 10).

At step 604, the computer can send a truck position to the back office. The position of the truck can be used to track the location of the truck on and off the job site. For example, the position of the truck can determine when the truck is a set distance away from the job site. In another example, the back office can determine when the truck is in (or approaching) a position to be loaded or unloaded by an excavator. The location of the truck can be stored on a database on the controller (e.g., driver app location 216).

At step 606, the back office can compare the position of a truck to an excavator position fence. The distance away from the excavator fence can be directed to the excavator to let them know how long they have until the haul truck will need to be unloaded. This can give the excavator an estimate of how long they can continue working on their current task before they will need to go load or unload the haul truck.

At step 608, the back office can alert an excavator when a haul truck has arrived. The excavator position fence can be set up by the back office to automatically notify an excavator as a truck crosses a fence that the truck will need to be loaded or unloaded. Alerting the excavator can allow the excavator to drive over to position before the truck gets there to maximize the efficiency on the job site.

At step 610, the back office can alert the computer (e.g., computer 231) and the controller (e.g., second controller 208) that the truck does not have a baseline scan, and the controller can capture and send a baseline scan to the back office. Alternatively or additionally, the baseline scan can be captured while the truck is enroute between fill and dump locations, for example.

At step 612, the excavator can enable a new truck fill operation. The new truck fill operation can log data regarding the filling of the truck (e.g., filling time, filling quantity (based on measurement systems installed on the excavator), filling location, filling pattern, or any other data that could be useful to know about how the haul truck was loaded by the excavator).

At step 614, a neural network on one of the controllers (e.g., first controller 200 or second controller 208) continually analyzes the scans received from a scanning device 102 to determine a location of a dump body on a haul truck. In one or more examples, trucks or excavators may include a QR code or an April tag to help the system 100 identify a truck type.

At step 616, the scanning device 102 on a boom of an excavator (e.g., the excavator 20) continuously scans the dump body as the excavator loads material into the dump body.

At step 618, the controller (e.g., first controller 200) can send a scan (e.g., the scan of a dump body or a scan of a loading operation from an excavator) of the dump body to the back office (e.g., second controller 208).

At step 620, the back office can compare a scan (e.g., the scan of a dump body or a scan of a loading operation from an excavator) of the dump body against a stored baseline scan, a 3D CAD model of a known dump body type, a bilateral comparator, or the flatness comparator to compare the scan and obtain volume differential values.

At step 622, the back office can send an alert to the dump truck and the excavator to scrape out the carryback in the dump body if any of the comparative functions output a value above or below a threshold value. For example, the comparator can output a positive value indicative of carryback in the dump body of the haul truck (e.g., when a volume of the scan of the dump body is subtracted from a volume of a known scan or 3D model). In another example, the comparator can output a negative value indicative of carryback in the dump body of the haul truck (e.g., when a volume of a known scan or 3D model is subtracted from a volume of the scan of the dump body).

At step 624, the back office can send a recapture baseline scan message to the dump truck and the excavator if any of the comparative functions output a value above or below a threshold value. For example, the comparator can output a positive value indicative of the need for a new baseline scan of the dump body of the haul truck (e.g., when a volume of a known scan or 3D model is subtracted from a volume of the scan of the dump body). In another example, the comparator can output a negative value indicative of the need for a new baseline scan of the dump body of the haul truck (e.g., when a volume of the scan of the dump body is subtracted from a volume of a known scan or 3D model).

The above-detailed description is intended to be illustrative, and not restrictive. The scope of the disclosure should, therefore, be determined with references to the appended claims, along with the full scope of equivalents to which such claims are entitled.

What is claimed is:

1. A system for detecting carryback within a dump body of a haul truck, the system comprising:
    an excavator configured to lift and dump material into the dump body, the excavator comprising a boom member configured to extend at least a portion of the boom member above the dump body;
    a scanning device configured to generate a scan of an interior surface of the dump body, the scan of the interior surface of the dump body including one or more captured images or three-dimensional data;
    a first controller located onboard the excavator and including:
       memory including instructions; and
       processing circuitry coupled to the memory, the instructions, when performed by the processing circuitry, configure the processing circuitry to:

receive the scan of the interior surface of the dump body;
determine a type of dump body by comparing the scan of the interior surface of the dump body with a plurality of scans of interior surfaces of known dump bodies;
detect, based on a difference between the scan of the interior surface of the dump body and a reference scan from the plurality of scans of interior surfaces of known dump bodies, a presence of carryback in the dump body, wherein the reference scan is selected based on the determined type of dump body;
calculate a difference in volume between the scan of the interior surface of the known dump body and the scan of the interior surface of the dump body; and
alert an operator of the excavator of an amount of carryback present in the dump body of the haul truck allowing the operator to avoid overloading the dump body of the haul truck;
a second controller located either on a job site or remotely and coupled to the memory, the first controller and the second controller are both configured to wirelessly communicate with each other, the second controller comprising:
processing circuitry;
a baseline model repository configured to store the plurality of scans of the interior surface of the known dump body;
a truck identification pin list, the truck identification pin list includes all known haul trucks that have entered the job site;
a driver identification pin list, the driver identification pin list includes all known drivers that have entered the job site;
a location of drivers on the job site, the location of the drivers on the job site tracks the location of every truck that has been on the job site; and
an excavator identification pin list, the excavator identification pin list includes all excavators on the job site; and
a computer configured to receive information from a driver of the haul truck, the computer configured to collect:
a driver identification pin;
a truck identification pin; and
a location of the haul truck via a global positioning sensor.

2. The system of claim 1, wherein the computer is a cell phone having an application that the driver executes to input the driver identification pin and the truck identification pin.

3. The system of claim 1, wherein the instructions configure the processing circuitry of the second controller to:
receive from the computer: the driver identification pin, the truck identification pin, and the location of the haul truck;
determine, with the truck identification pin, a dump body type for the haul truck by referencing the truck identification pin list;
retrieve, from the baseline model repository, the scan for the dump body type relating to the truck identification pin;
receive, from the first controller, the scan of the interior surface of the dump body;
calculate the carryback using at least one scan comparative algorithm to compare the scan for the dump body type relating to the truck identification pin and the scan of the interior surface of the dump body for hauling material; and
send an alert to the computer if the carryback is calculated.

4. The system of claim 3, wherein the second controller includes an inventory management system, the inventory management system is configured to cause the processing circuitry of the second controller to:
calculate an estimated amount of material that can be loaded in the dump body of the haul truck;
subtract the amount of carryback calculated to find an actual amount of material transferred; and
store the actual amount of material transferred to update a job site accounting.

5. The system of claim 1, wherein the first controller comprises a new truck program, when executed, the new truck program causes the processing circuitry to:
assign a unique truck identification pin to a new truck on the job site;
communicate the unique truck identification pin to the second controller, the second controller stores the unique truck identification pin to the truck identification pin list;
send a signal to the scanning device to capture a scan of the new truck on the job site; and
communicate the scan of the new truck on the job site to the second controller, the second controller stores the scan in the baseline model repository.

6. The system of claim 5, wherein the second controller comprises a new truck prompt program, when executed, the new truck prompt program causes the processing circuitry of the second controller to:
send an alert to the computer to run the new truck program upon not finding the truck identification pin from the first controller in the truck identification pin list.

7. The system of claim 1, wherein the second controller comprises:
a bilateral symmetry scan comparator algorithm configured to detect carryback within the dump body of the haul truck that cannot be identified by the system and, when executed, causes the processing circuitry of the second controller to:
send a signal to the scanning device to capture an additional scan of the dump body of the haul truck;
analyze the additional scan to determine an area that corresponds to the dump body of the haul truck;
extract a disparity map as a three-dimensional point cloud from the captured scan;
rectify the three-dimensional point cloud from the captured scan onto a XY plane;
split the additional scan in half at a middle point of a X plane to create a first half of points and a second half of points;
compare a height of each point on the first half of points to a correlating point on the second half of points to generate one or more bilateral symmetry scores; and
compile the one or more bilateral symmetry scores and compare them against a threshold number,
wherein if the bilateral symmetry comparator scan comparator algorithm determines the bilateral symmetry scores are above a threshold value, alert the operator that carryback may be present in the dump body of the haul truck.

8. The system of claim 1, wherein the second controller comprise:
- a flatness scan comparator algorithm configured to detect carryback within the dump body of the haul truck that cannot be identified by the system, executing the flatness scan comparator algorithm: sends a signal to the scanning device to capture an additional scan of the dump body of the haul truck;
- analyze the additional scan to determine an area that corresponds to the dump body of the haul truck;
- extract a disparity map as a three-dimensional point cloud from the additional scan;
- rectify the three-dimensional point cloud from the captured scan onto a XY plane;
- compare a highest and a lowest point on a plane to calculate one or more flatness scores; and
- compile the one or more flatness scores and compare them against a threshold number,
- wherein if the flatness scan comparator algorithm determines the one or more flatness scores are above a threshold value, alert the operator that carryback may be present in the dump body of the haul truck.

9. A method for calculating carryback in a dump body of a haul truck, the dump body with an interior surface, the method comprising:
- comparing a scan of the interior surface of the dump body taken by a scanning device with at least one scan of a known dump body of a plurality of known dump bodies;
- determining a type of dump body captured by the scanning device when the scan of the interior surface of the dump body matches one of the at least one scan of the known dump body of the plurality of known dump bodies;
- detecting, based on a difference between the scan of the interior surface of the dump body and a reference scan from the at least one scan of the known dump body of the plurality of known dump bodies, a presence of carryback in the dump body, wherein the reference scan is selected based on the determined type of dump body; and
- sending the scan of the interior surface of the dump body to a second controller from a first controller, the first controller located on an excavator;
- receiving with the second controller a driver identification pin, a truck identification pin, and a location of the haul truck from a computer operated by a driver of the haul truck;
- determining a truck type by comparing the received truck identification pin and a truck identification pin list stored on the second controller;
- retrieving a 3D CAD model of a known truck type that matched the truck type of the truck identification pin from a truck type 3D CAD model database on the second controller;
- detecting a presence of carryback using at least one scan comparative algorithm to compare the 3D CAD model of the known truck type related to the truck identification pin and the scan of the interior surface of the dump body; and
- sending the computer an alert if carryback is detected.

10. The method of claim 9, further comprising:
- calculating, with the second controller, the carryback in the dump body by calculating a difference in volume between the scan of the interior surface of the dump body and the at least one scan of the interior surface of the known dump body of a similar type; and
- alerting an operator of the excavator of an amount of carryback present in the dump body of the haul truck to prevent the excavator operator from overloading the dump body.

11. The method of claim 9, wherein the second controller includes an accounting software configured to track an amount of material moved by the haul truck on a job site, the method updates the accounting software, the method comprising:
- calculating an amount of carryback when carryback is detected by comparing a volume of the dump body in the 3D CAD model and a volume of the dump body captured by the scan of the interior surface of the dump body; and
- adjusting the amount of material moved by the haul truck on the job site by the amount of carryback calculated to accurately account for the carryback not removed from the dump body of the haul truck.

12. A method for calculating carryback in a dump body of a haul truck, the dump body with an interior surface, the method comprising:
- comparing a scan of the interior surface of the dump body taken by a scanning device with at least one scan of a known dump body of a plurality of known dump bodies;
- determining a type of dump body captured by the scanning device when the scan of the interior surface of the dump body matches one of the at least one scan of the known dump body of the plurality of known dump bodies;
- detecting, based on a difference between the scan of the interior surface of the dump body and a reference scan from the at least one scan of the known dump body of the plurality of known dump bodies, a presence of carryback in the dump body, wherein the reference scan is selected based on the determined type of dump body;
- sending the scan of the interior surface of the dump body to a second controller from a first controller, the first controller located on an excavator wherein the first controller further comprises a new truck program, when executed, the new truck program:
  - assigns a unique truck identification pin to a new truck on a job site;
  - communicates the unique truck identification pin to the second controller, the second controller stores the unique truck identification pin to a truck identification pin list;
  - sends a signal to the scanning device to capture a scan of the new truck on the job site; and
  - communicates the scan of the new truck on the job site to the second controller, the second controller stores the scan in a baseline model repository.

* * * * *